United States Patent Office 3,849,537
Patented Nov. 19, 1974

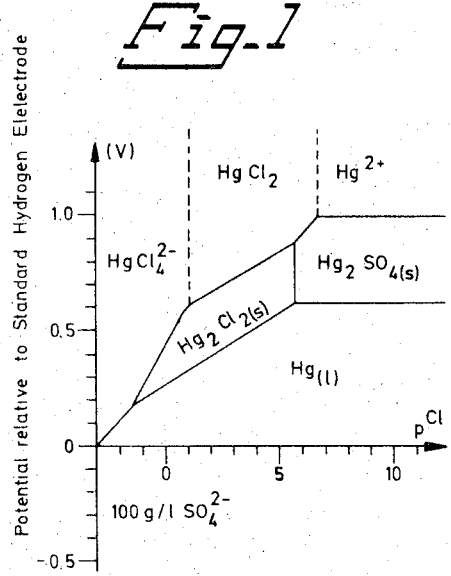
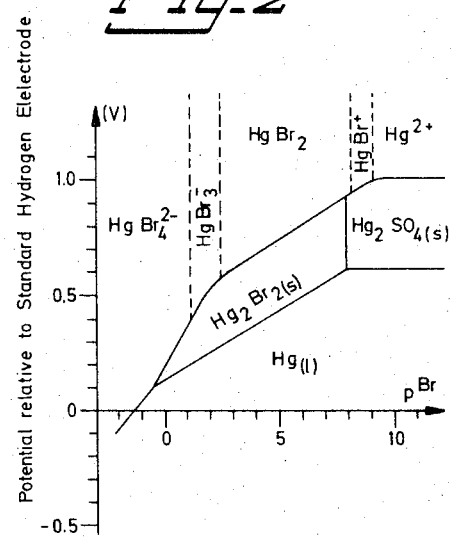
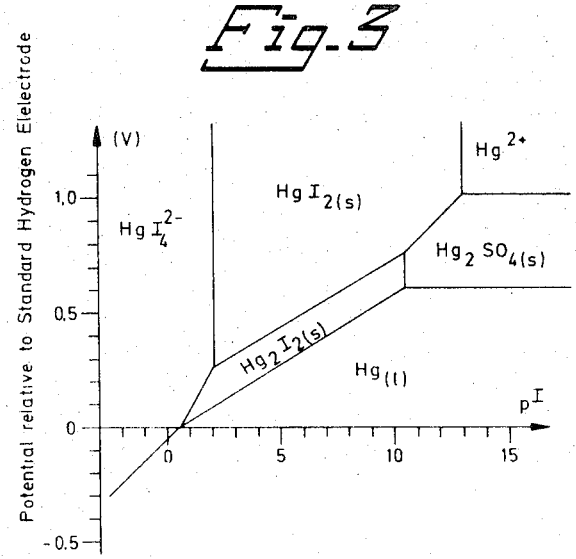

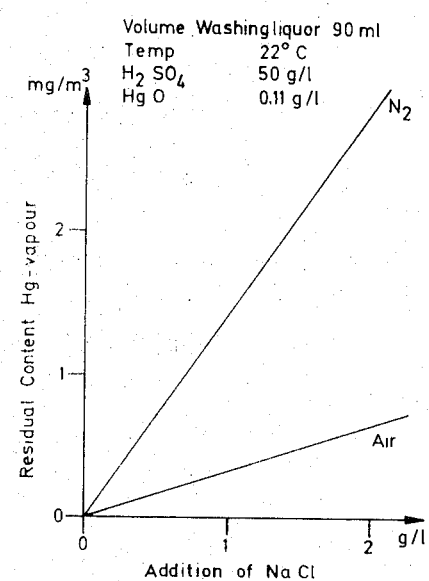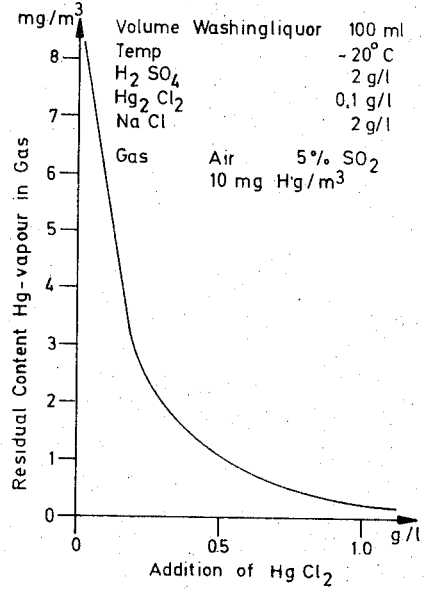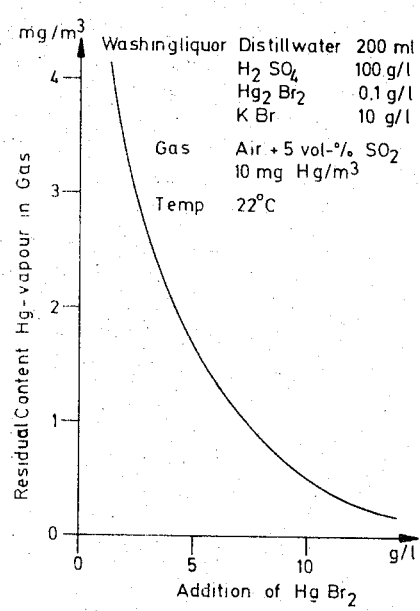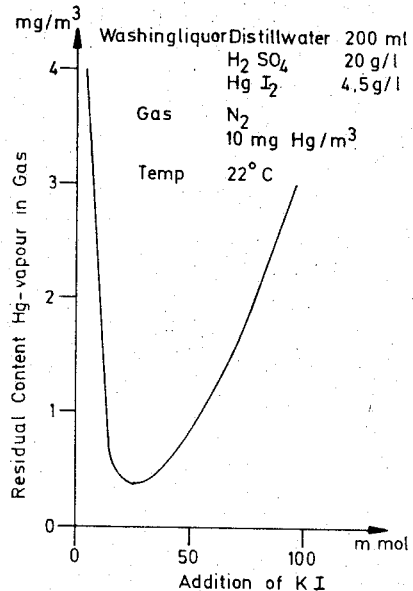

3,849,537
METHOD OF PURIFYING GASES CONTAINING MERCURY VAPOUR
Torkel Allgulin, Skelleftehamn, Sweden, assignor to Boliden Aktiebolag, Stockholm, Sweden
Filed Feb. 23, 1972, Ser. No. 228,610
Claims priority, application Sweden, Feb. 23, 1971, 2,300/71
Int. Cl. B01d 53/34
U.S. Cl. 423—210
16 Claims

ABSTRACT OF THE DISCLOSURE

A method of purifying gases containing gaseous elementary mercury. A washing solution is prepared in which there is maintained a content of mercury(II) ions ranging from 0.02 g./l. to saturation point and a content of at least one anion selected from the group $Cl^-$, $Br^-$, $I^-$ and $SO_4^{2-}$, these compounds forming sparingly soluble $Hg(I)$ salts. The quantity of the compounds introduced into the washing solution is sufficient to enable formed $Hg(I)$ to be precipitated out but insufficient to cause corresponding $Hg(I)$ salts to be disproportioned to $Hg(II)$ and $Hg^0$. The contaminated gas is then washed with the thus prepared solution and in those instances when the gas contains reducing agents $Hg(II)$ is complex bound with $Cl^-$, $Br^-$ and/or $I^-$ ions to prevent the reduction of $Hg(II)$.

---

Figure 4:
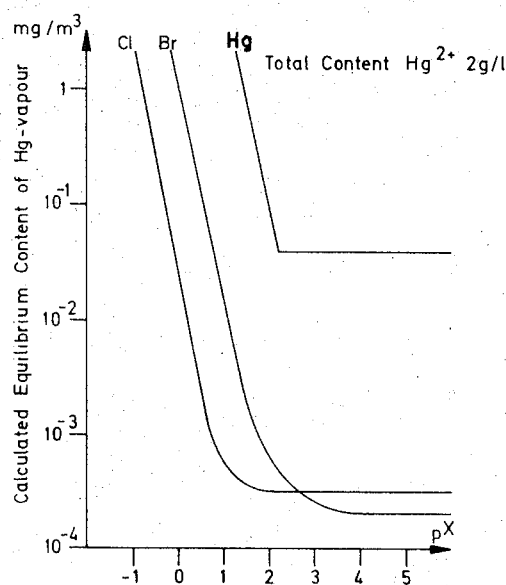
Figure 5:
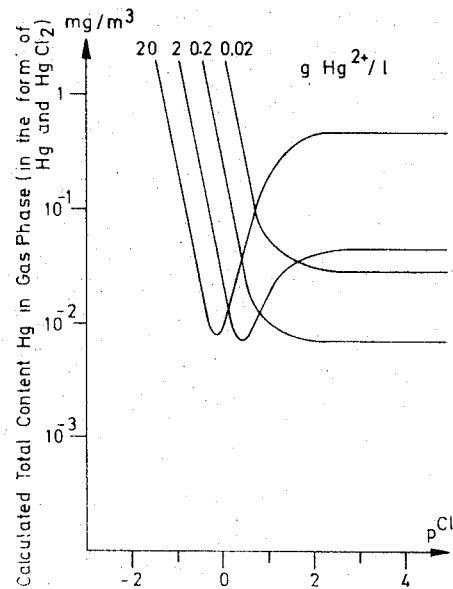

The present invention relates to a method of purifying gases containing a gaseous elementary mercury, $Hg^0$. The method is especially applicable for the removal of mercury vapor from roaster gases obtained when roasting sulphidic ores containing mercury compounds, although it can also be applied to advantage for removing mercury from other gases.

It has been discovered—particularly during recent years—that the presence of mercury in industrial processes leads to mixed nuisance risks through gases and other waste products discharged from the plant and to the contamination with mercury of the product under manufacture. This problem is particularly serious, when the product under manufacture is a foodstuff or animal fodder. Since sulphuric acid is used in very large quantities within the chemical industry, it has become increasingly important that the mercury content of the sulphuric acid produced is at an absolute minimum.

It is known to remove elementary mercury by absorption and oxidation in solutions, one example being the emersion of mercury-containing gases in a hypochloride solution at a pH 4.5–9. Such a method is described in the USSR Pat. 165,900 and U.S. Pat. 3,476,552. It is also known that potassium permanganate solutions can be used for absorbing elementary mercury, particularly for analytical purposes. See for example Amer. Ind. Hyg. Assoc. J. 17,418–20 (1956).

A number of processes have also been proposed for absorbing elementary mercury in gases on solid material, such as carbon and other carriers which have been impregnated, for example, with sulphides (see for example the German Pat. 1,075,953 and the U.S. Pat. 3,194,629).

In addition to being formed when roasting mercury containing minerals, gases containing elementary mercury are also formed with chlorine-alkali-processes and during the regeneration of certain mercury-containing catalysts used in organic syntheses.

When roasting sulphidic minerals containing mercury compounds, the major portion of mercury present in the minerals can be separated from the gas as compounds in particle form, by means of conventional gas purifying methods. It is impossible, however, to control the roasting process in a manner such that the quantity of elementary, gaseous mercury contained in the particle-free gas is sufficiently low. No difficulty is met in expelling mercury compounds from the roasted goods, and mercury present in the material will therefore normally be embodied in the roaster gas as mercury compounds and elementary mercury in particle or vapor form. It is possible in practice to remove particulate mercury by conventional dust purifying processes, while the mercury vapor accompanies the gas through the whole of the sulphuric acid manufacturing process and enters the sulphuric acid as a contaminant.

When roasting sulphide ores, a sulphide dioxide containing roaster gas is obtained which normally has a sulphur dioxide content of 4–16%. The gas is contaminated to a greater or lesser extent with volatile compounds, the extent of this contamination depending upon the composition of the ore. The compounds in this respect are normally, for example, compounds of arsenic, lead and antimony and mercury in free and chemically bound form. The obtained sulphur dioxide-containing roaster gas is normally used for manufacturing sulphuric acid and sulphur trioxide and liquid sulphur dioxide. The manufacture of sulphuric acid, sulphur trioxide and liquid sulphur dioxide requires an extremely pure sulphur dioxide gas, since impurities in the gas may, in some instances, unfavorably affect the reaction sequence when producing sulphuric acid and sulphur trioxide and are liable to become embodied in the final product as a contaminant and to impurify the waste gases departing from the plant.

The roaster gases formed when roasting sulphide material are passed from the furnace to a cyclone for example, where the gases are cleansed from accompanying dust in a conventional manner. The gases are then cooled and dry cleaned, for example in an electrofilter. Final purification of the gas is carried out, for example, by washing the gas in a washing tower with an accompanying wet electrofilter. It has not been possible, however, to remove elementary gaseous mercury from the gases to a satisfactory extent when applying the aforementioned purifying methods.

It has now been discovered that gaseous elementary mercury present in gases can be removed therefrom with a high degree of efficiency by washing the same with a wash solution in which a content of mercury(II) ions is maintained from 0.02 g./l. to saturated solution, and by maintaining in the wash solution such a content of one or more anions selected from the group $Cl^-$, $Br^-$, $I^-$ and $SO_4^{2-}$, which form difficutly dissolved $Hg(I)$ salts, that formed $Hg(I)$ can be precipitated out, and at most in such a quantity that corresponding $Hg(I)$ salt is not disproportioned to $Hg(II)$ and $Hg^0$, and preventing possible existing reducing gas components from reducing $Hg(II)$ by complex binding $Hg(II)$ with $Cl^-$, $Br^-$ and/or $I^-$-ions (see the phase diagrams 9, 10 and 11).

During the washing stage, the temperature of the washing liquor should be held between 0° and 70° C. It is of particular advantage to use a temperature below about 35° C. The method is thus characterized in that the wash solution contains an oxidant for elementary mercury in the form of a $Hg^{2+}$-$X^-$-complex, where X is chlorine, bromine or iodine, wherewith $Hg_2^{2+}$ are formed according to the reaction $Hg^{2+} + Hg \rightarrow Hg_2^{2+}$, whereafter $Hg_2X_2$ precipitates out as a difficultly dissolved salt. It has thus been found that $Hg^{2+}$ in the presence of an excess of $X^-$ is particularly selective and active in the absorption and oxidation of $Hg^0$-vapor. When purifying gases which do not reduce $Hg(II)$ or which reduce $Hg(II)$ to only a small extent, halogen ions can be excluded, or added to the washing liquor in only very small quantities. The formed $Hg(I)$ then precipitates out in the presence of $SO_4^{2-}$-ions as difficultly dissolved $Hg_2SO_4$.

The presence of halogenide ions, $X^-$ means that possible reduction of $Hg^{2+}$ with reducing gas components is completely or partially prevented by the fact that $Hg^{2+}$ forms complex $HgX_n^{2-n}$, where $n$ is an integer between 1 and 4, and because the halogenide ions precipitate mercury(I)halogenide in a readily recoverable form, whereby Hg(I)-ion activity is also low.

In order to obtain the advantageous results afforded by the present invention, it is necessary to maintain a certain content of $Hg^{2+}$ in the washing liquor. This can be achieved by adding $Hg^{2+}$ ions and is most suitably effected continuously by oxidizing precipitated $Hg_2X_2$ to a dissolvable salt in which mercury(II)ions are present and are returned to the wash liquor. In a similar manner, the halogenide ion content must be maintained in the system. The mercury converted during the washing process to $Hg_2X_2$, similarly to such in dissolved form or in solid phase in the washing liquor, has a so low vapour pressure that the departing roaster gas is practically free of mercury. If $Hg^{2+}$ is added in the form of $HgCl_2$, an undesirable excess of $Cl^-$-ions will be obtained at the equilibrium state, owing to the fact that the following reaction cannot be entirely avoided:

$$2HgCl_2 + SO_2 + 2H_2O \rightarrow Hg_2Cl_2 + 2HCl + H_2SO_4.$$

This excess can be regulated by regularly removing washing liquid from the washing system.

Figure 6:
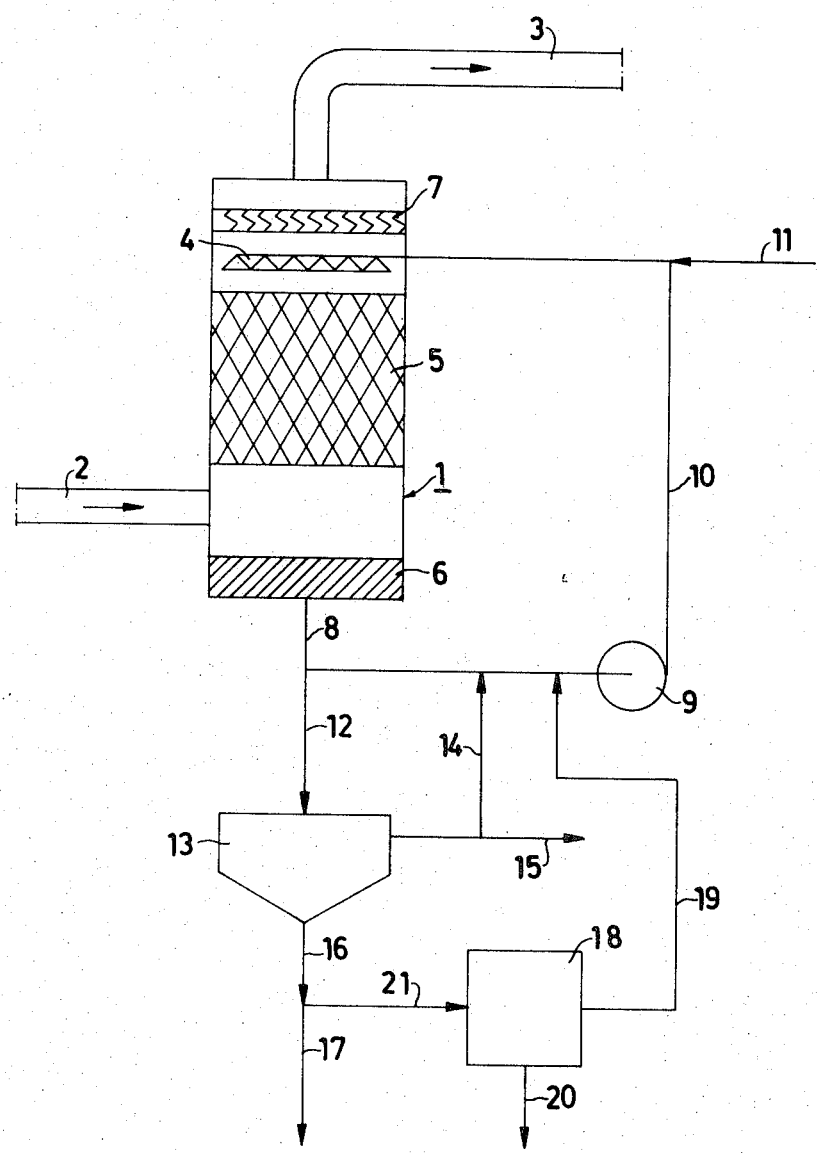

Of the accompanying Figures, FIGS. 1-5 illustrate the conditions of equilibrium concerning different systems according to the invention, as hereinafter described. FIG. 6 illustrates a washing system constructed according to the invention. FIGS. 7-13 illustrate results obtained from various tests.

The diagram illustrated in FIGS. 1, 2 and 3 shows the existence region for Hg(I) at different oxidation potentials and at a Hg(II) content of 2 g./l. in the washing liquid. The phase diagram illustrates in the exemplary case that Hg(II) oxidizes $Hg^0$ at 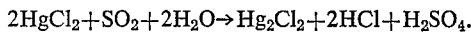 $pI-> 0.75$, which means that the total content of $Cl < 350$ g./l., $Br < 25$ g./l. and $I < 25$ g./l.

FIGS. 1, 2 and 3 are thus theoretic diagrams which illustrate the chemical state of mercury at different redox potentials and pCl-, pBr- and pI-values. The activity of the dissolved components has been selected to $10^{-2}$ M. The $SO_4^{2-}$ activity has been selected to 1 M, and the pH is assumed to be so low that HgO does not precipitate out. The temperature is equal to 25° C. The driving force for the oxidation of liquid Hg or saturated Hg vapor with divalent mercury is proportional to the extent of the monovalent phase vertically in the phase diagram. Departing from this fact, theoretic equilibrium contents of Hg-vapor in gaseops phase over solutions containing $Hg^{2+}$ and solid $Hg_2X_2$ have been calculated at different pX (X=Cl, Br or I). The results are shown in diagram 4.

In diagram 5, the total quantity of $Hg^{2+}$ for the chloride case has been varied and, additionally, attention has been paid to the calculated vapor pressure for $HgCl_2$. The content in the gas phase is thus the sum of Hg vapor and Hg in the form of $HgCl_2$. This diagram makes it possible to assess how large the suitable content of $Hg^{2+}$ and $Cl^-$ in the washing liquid shall be in order that the purified gas shall obtain a minimum total content of Hg-vapor and $HgCl_2$-vapor.

In addition to the equilibrium conditions, the kinetics also play an important part during the absorption process, and hence with the same equilibrium content of Hg in the gas phase a high total content of $Hg^{2+}$ is preferred to a low content.

In a similar manner, the maximum values with an Hg(II) content of 0.02 g./l. in the washing liquid can be calculated as: $Cl^- < 35$ g./l., $Br^- < 5$ g./l. and $I^- < 4$ g./l. If the gas to be purified contains a gas component which reduces Hg(II), e.g. $SO_2$, it is necessary in order to lower the consumption of Hg(II) to protect this ion by complex building with halogenide ions. Hence a certain minimum quantity of halogenide ions should be present in the washing liquid. With a content of Hg(II) between 0.02 and 20 g./l. in washing liquid, the total content of Cl should lie between 0.007 g./l. and 350 g./l. It has been found experimentally, however, that the Hg(II)-content may rise to the saturation limit for $HgCl_2$, with satisfactory washing results, which is also the case, when the halogenide is $Br^-$ or $I^-$. When the washing liquid contains very high contents of Hg(II), a smaller quantity of washing liquid can be used with correspondingly smaller apparatus.

In a similar manner as above, it has been discovered that for the total contents of Br and I with an initial total content of Hg(II) from 0.02 g./l. to 20 g./l., the total quantity of $Br^-$ is 0.016 g./l.-100 g./l. and of $I^-$ 0.025 g./l.-130 g./l.

The preferred areas for the contents of Cl, Br and I are thus fully dependent on the content of Hg(II) in the solution.

The aforedescribed method of purifying gases from elementary mercury is suitably carried out by washing the gases in a conventional washing apparatus. The washing liquid is suitably circulated in a completely closed system, with the exception of a small drain-off portion, which is thoroughly cleaned before discharging the effluent to the recipient. All of the circulating washing liquid, or a portion thereof, is cleansed from precipitated $Hg_2X_2$ by sedimentation, centrifuging or filtration. Separated precipitated $Hg_2X_2$ is then oxidized to provide a sufficient quantity of $Hg^{2+}$ for recirculation to the washing system.

The process of oxidizing $Hg_2X_2$ to $Hg^{2+}$ can be effected in any known manner. For example, the corresponding halogens can be used as the oxidant. Sludge separated from the washing liquid can be contacted with, e.g. $Cl_2$ at a temperature of 20-60° C., subsequent to optionally de-gasing residual sulphur dioxide. The reaction is rapid and takes place substantially with a complete yield with respect to $Cl_2$. Solid $Hg_2Cl_2$ is transformed to an aqueous solution of $HgCl_2$ according to the formula $Hg_2Cl_2 + Cl_2 \rightarrow HgCl_2$. At a slightly elevated temperature, the solubility of $HgCl_2$ is approximately 100 g./l.

A suitable washing system for removing mercury from roaster gases in accordance with the invention is illustrated in FIG. 6.

The Figure illustrates a washing tower (1) provided with an inlet (2) for contaminated gas and an outlet (3) for purified gas. Washing liquid is injected into the washing tower via nozzles (4) over packing bodies (5), and the washing liquid is collected in the bottom (6) of the washing tower. The washing tower is provided with a droplet separator (7), to prevent the washing liquid from being entrained with the gas. The washing liquid is passed from the washing tower, via a line (8), to a pump (9) for recirculation to the tower via a line (10). Fresh washing liquid or water can be introduced to the washing system via a line (11). A portion of the washing liquid passing to the line (8) is conducted through a line (12) and charged to a sludge separator (13), which may comprise a sedimentation means, filtering device or a centrifuge. Once freed from sludge, the washing liquid is returned via a line (14) to the washing system, or is withdrawn from the system via a line (15) and totally purified. Sludge is removed from the sludge separator via a line (16) and passed either to a sludge silo, via a line (17), or to a regenerating means (18), via a line (21). Regenerated washing liquid is passed from the regenerating means (18), via a line (19), to the pump (9). Waste matter is removed from the regenerating means via a line (20).

The invention will now be illustrated with reference to a number of examples.

The tests were carried out under standardized conditions in a manner such that 1 l./min. of a specific type of gas containing $\sim$10 mg. Hg.°/m.³ was passed through a 250 ml. washing a flask filled with 200 ml. washing liquid, whereafter the departing gas was analyzed with respect to its content of elementary gaseous Hg.

The obtained results are shown below with reference to different ones of the FIGS. 7-13.

EXAMPLE 1

In a first test the purifying effect of the washing system was tested with different contents of sodium chloride added to the washing liquid.

The volume of washing liquid was 90 ml., and the liquid had a temperature of 22° C. and contained 50 g. of sulphuric acid per liter and 0.11 g. of mercury(II)oxide per liter. FIG. 7 illustrates how the residual content of $Hg°$-vapour in mg./m.$^3$ varies with the quantity of sodium chloride added per liter. The diagram shows that the washing effect decreases with an increase in the chloride ion content. This decreased result is due to the fact that $Hg^{2+}$-ions are complex bound.

EXAMPLE 2

FIG. 8 illustrates the results of tests relating to the purification of air containing 5% by volume sulphur dioxide and mercury with a varying quantity of mercury (II)chloride added to the washing liquid.

100 ml. of washing liquid were used in the test, at a temperature of about 20° C., the washing liquid contained 2 g. of sulphuric acid per liter, 0.1 g. of mercury(I)chloride per liter, 2 g. of sodium chloride per liter. The gas was air and contained sulphur dioxide in addition to about 10 mg. of mercury per m.$^3$.

The diagram shows the good effect obtained when using quantities of mercury(II)chloride as small as 0.25 g./l.

EXAMPLE 3

FIG. 9 shows the result of tests relating to the purification of air containing 5% by volume sulphur dioxide and mercury with a varying addition of mercury(II)bromide to the washing liquid.

200 ml. of washing liquid containing 100 g. sulphuric acid per liter, 0.1 g. of mercury(I)bromide per liter and 10 g. of potassium bromide per liter was used in the test. The temperature of the washing liquid was 22° C. The gas was air containing 5% by volume sulphur dioxide.

The test shows the same tendency as that obtained in Example 2, although in order to obtain a good effect the quantity of $HgBr_2$ must be made ten times larger than that necessary when using $HgCl_2$.

EXAMPLE 4

FIG. 10 shows the results of tests relating to the purification of nitrogen gas containing mercury in an iodide system with a varying addition of potassium(II)iodide to the washing liquid.

200 ml. of washing liquid containing 20 g. of sulphuric acid per liter, 4.5 g. of mercury(II)iodide per liter were used in the test. The temperature of the washing liquid was 22° C. The gas was nitrogen saturated with 10 mg. Hg per m.$^3$.

The diagram shows that the degree of purification is improved with minor additions of iodide ions, owing to the fact that an increasingly larger portion of the oxident is converted in dissolved form by the following reaction:

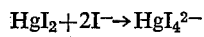

With further additions of KI, the purifying effect passes a maximum, whereafter the degree of purification is impaired as a result of a decrease in the thermodynamic driving force for the reaction:

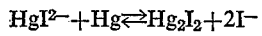

The reaction according to the formula changes direction and moves to the left, i.e. $Hg_2I_2$ is instead disproportioned at a relatively moderate excess of iodide ions.

EXAMPLE 5

Figure 11:
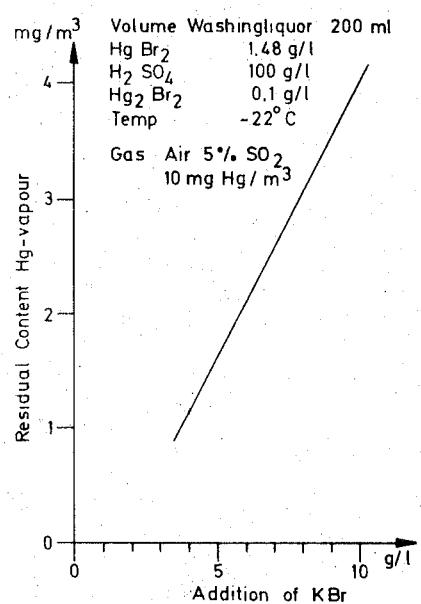

FIG. 11 shows the result of tests relating to purification of air containing 5% by volume sulphur dioxide and mercury with varying potassium bromide content.

200 ml. of washing liquid, containing 1.43 g. of mercury(II)bromide, 0.1 g. of mercury(I)bromide and 100 g. of sulphuric acid per liter were used in the test. The temperature of the washing liquid was maintained at 22° C. The gas used was air with 5% by volume sulphur dioxide.

The diagram shows that an increase in the bromide ion content reduces the purification effect of the washing liquid.

EXAMPLE 6

Figure 12:
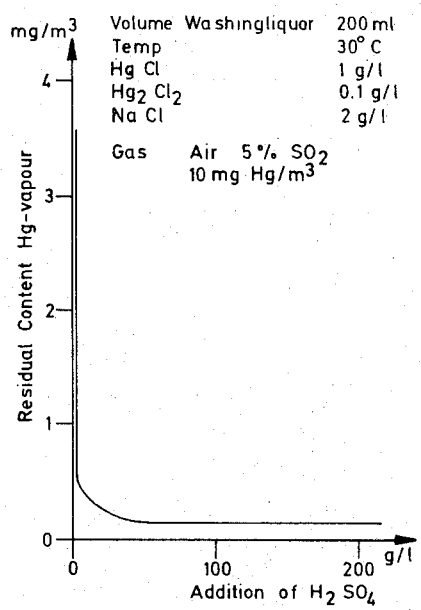

FIG. 12 shows the result of tests relating to the purification of air containing mercury and 5% by volume sulphur dioxide at different contents of sulphuric acid in the washing liquid.

200 ml. of washing liquid containing 1 g. of mercury (II)chloride, 0.1 g. of mercury(I)chloride and 2 g. of sodium chloride per liter were used in the test. The temperature of the washing liquid was 30° C.

The diagram shows that a certain quantity of sulphuric acid in the washing solution has a positive effect on the purification of the gas. This effect is thought to be due to the fact that the redox potential in the solution is increased with increased $a_{H}^+$ and $aSO_4^{2-}$.

EXAMPLE 7

Figure 13:
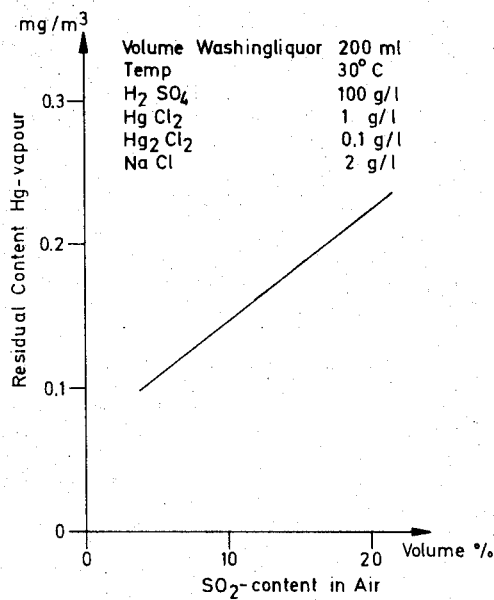

FIG. 13 illustrates the result of tests relating to the purification of air saturated with mercury and containing varying contents of sulphur dioxide.

200 ml. of washing liquid containing 100 g. of sulphuric acid, 1 g. of mercury(II)chloride, 0.1 g. of mercury(I) chloride and 2 g. of sodium chloride per liter were used in the test. The temperature of washing liquid was 30° C.

FIG. 13 shows that the purification effect decreases with an increasing content of sulphur dioxide, which is probably due to the fact that the redox potential in the solution decreases with the increasing sulphur dioxide content.

I claim:

1. A method for purifying gases containing gaseous elementary mercury, comprising: preparing a washing solution containing mercury (II)ions in a quantity from 0.02 g./l. to saturation level and a quantity of at least one of the ions selected from the group $Cl^-$, $Br^-$, $I^-$ and $SO_4^{2-}$ which form sparingly soluble Hg(I) salts, the quantity of $Cl^-$, $Br^-$, $I^-$ and $SO_4^{2-}$ being sufficient to enable formed Hg(I) to precipitate out from the solution but insufficient to cause corresponding Hg(I) salts to be disproportioned to Hg(II) and $Hg°$, washing the contaminated gas with said solution.

2. A method according to claim 1 of purifying gases containing gaseous elementary mercury but which do not contain components which reduce mercury (II)ions or which contain only small quantities of such components, comprising maintaining in the washing solution a mercury (II) content of 0.02 g./l. to saturated solution and maintaining in said solution a sulphate content of such magnitude that formed Hg(I) can precipitate out.

3. A method according to claim 1 additionally comprising the step of complexing Hg(II) with an ion selected from the group consisting of $Cl^-$, $Br^-$, $I^-$ and mixtures thereof, to prevent reduction of the Hg(II) where the gas contains a reducing agent.

4. A method according to claim 3, of purifying gases containing components which reduce mercury (II)ions, comprising maintaining the total content of chloride in the washing solution between 0.007–350 g./l. at a total content of mercury (II) in the range of 0.02 g./l. to a saturated solution.

5. A method according to claim 3 of purifying gases containing components which reduce mercury (II) ions, comprising maintaining the total content of bromide in the washing solution between 0.016–100 g./l. at a total content of mercury (II) in the range of 0.02 g./l. to a saturated solution.

6. A method according to claim 3, of purifying gases containing components which reduce mercury (II) ions, comprising maintaining the total content of iodine in the washing solution between 0.025–130 g./l. at a total content of mercury(II) in the range of 0.02 g./l. to a saturated solution.

7. A method according to claim 1 wherein the washing solution has a pH-value lower than 6.

8. A method according to claim 1 comprising maintaining the temperature of the washing solution between 0 and 70° C.

9. A method according to claim 7, wherein the washing liquid has a pH-value lower than 2.

10. A method according to claim 8, comprising maintaining the temperature of the washing solution between 15 and 35° C.

11. A method according to claim 1, additionally comprising adding ions selected from the group consisting of Hg(II) ions and halogenide ions to the washing solution.

12. A method according to claim 1, additionally comprising adding ions selected from the group consisting of Hg(II) ions and halogenide ions to the gas.

13. A method according to claim 1, additionally comprising adding mercury(II) halogenide to the washing solution.

14. A method according to claim 1, additionally comprising adding mercury(II) halogenide to the gas.

15. A method according to claim 1, comprising adding a material selected from the group consisting of sodium halogenides and potassium halogenides, to the washing solution.

16. A method according to claim 1, comprising adding Hg(II) in the form of HgO to the washing solution.

References Cited

FOREIGN PATENTS 1,207,215   9/1970   Great Britain _____ 204—99

EARL C. THOMAS, Primary Examiner

U.S. Cl. X.R.

423—491, 544; 204—99